United States Patent [19]

Muller

[11] 3,977,886

[45] Aug. 31, 1976

[54] TRANSPARENT GLASS CERAMIC WITH SMALL THERMAL EXPANSION

[75] Inventor: Gerd Muller, Mainz-Weisenau, Germany

[73] Assignee: Jenaer Glaswerk Schott & Gen., Mainz, Germany

[22] Filed: Oct. 3, 1974

[21] Appl. No.: 511,556

Related U.S. Application Data

[63] Continuation of Ser. No. 267,266, June 29, 1972, abandoned.

[30] Foreign Application Priority Data

July 1, 1971 Germany............................ 2132788

[52] U.S. Cl................................ 106/39.7; 106/39.8; 106/52
[51] Int. Cl.$^2$........................ C03C 3/22; C03C 3/04
[58] Field of Search............................ 106/39.7, 52

[56] References Cited
UNITED STATES PATENTS

| | | | |
|---|---|---|---|
| 3,241,985 | 3/1966 | Kuwayama........................ | 106/39.7 |
| 3,252,811 | 5/1966 | Beall................................. | 106/39.7 |
| 3,282,712 | 11/1966 | Tashiro............................. | 106/39.7 |
| 3,499,773 | 3/1970 | Petticrew......................... | 106/39.7 |
| 3,537,868 | 11/1970 | Kosaka............................. | 106/39.7 |
| 3,573,077 | 3/1971 | Beall................................. | 106/39.7 |
| 3,585,055 | 6/1971 | Beall................................. | 106/39.7 |
| 3,642,504 | 2/1972 | Petzold............................. | 106/39.7 |
| 3,788,865 | 1/1974 | Babcock et al.................... | 106/39.7 |

Primary Examiner—Winston A. Douglas
Assistant Examiner—Mark Bell
Attorney, Agent, or Firm—Burgess, Dinklage & Sprung

[57] ABSTRACT

Colorless, transparent glass ceramic with a linear thermal expansion which is smaller than $15 \times 70^{-7}/°C$ in the temperature range from 20° to 300°C, produced from a glass, which has been melted and shaped and thereafter subjected to a heat treatment for the controlled crystallization of innumerable, irregularly oriented, minute crystals of the structural type of $\beta$-quartz, characterized in that it has, to at least 85% by weight, the following composition based on oxides:

| | | |
|---|---|---|
| $SiO_2$ | 45 to | 68% by weight |
| $Al_2O_3$ | 15 to | 30% by weight |
| $P_2O_5$ | 0 to | 10% by weight |
| $Li_2O$ | 2 to | 6% by weight |
| $MgO$ | 0 to | 3% by weight |
| $ZnO$ | 0 to | 8% by weight |
| $ZrO_2$ | 2 to | 7% by weight |
| $Ta_2O_5$ | 1 to | 7% by weight | the contents of $Li_2O$, $MgO$, $ZnO$ and $P_2O_5$ being such that the existing $Al_2O_3$ content, to within a residue or a deficit of $Al_2O_3$ of up to about 4% by weight, is sufficient for forming the formula units $LiAlO_2$, $MgAl_2O_4$, $ZnAl_2O_4$ and $AlPO_4$.

27 Claims, No Drawings

TRANSPARENT GLASS CERAMIC WITH SMALL THERMAL EXPANSION

This is a continuation, of application Ser. No. 267,266, filed June 29, 1972, now abandoned.

BACKGROUND

The invention relates to a transparent glass ceramic containing β-quartz crystalline solid solutions, which ceramic is colorless and has in the temperature range from 20° – 300°C a thermal longitudinal expansion of less than $15 \times 10^{-7}$ /°C.

It is known that fine-grain crystalline solid solutions having an β-quartz or β-spodumene structure can be precipitated by heat treatment from glasses containing essentially the components $SiO_2$, $Al_2O_3$, $P_2O_5$, $Li_2O$, MgO and ZnO, if the glasses contain small quantities of so-called nucleating agents as well as the said main constituents. The fine-grain and uniform precipitation of these types of crystals has the effect that the formed glass-crystal mixed body, which is generally designated as glass ceramic, is distinguished as regards most properties in a characteristic manner from the glass from which it was formed. Particularly outstanding is the unusually low thermal expansion of such bodies, which can even be negative, and which is determined by special properties of the crystal structure of the said crystalline solid solutions. The low thermal expansion leads to an extreme stability with respect to change in temperature of such glass ceramics, and this is a property which is extremely significant for many uses.

Normally, the glass ceramics are opaque or have a porcelain-like translucency. Under certain conditions, for example, when the formed crystals are much smaller than the wavelengths of the visible light, or when the refractive indices of the crystals and of the residual glass show a sufficiently small difference from one another, glass ceramics can also be transparent. Suitable glass compositions and processes for the heat treatment in order to produce transparent glass ceramics with a very small thermal expansion are for example indicated in German Offenlegungsschrift No. 1 596 860. According to this teaching, the initial glass has to contain 1.5 to 6% by weight of $TiO_2$ and 0.5 to 3% by weight of $ZrO_2$ as nucleus formers, so that a transparent glass ceramic can be produced. The content of $TiO_2$ has the effect, as a displeasing secondary phenomenon, of imparting to the glass ceramic a distinct brown coloring. This is all the more pronounced if, as instructed in U.S. Pat. No. 3,157,522, only $TiO_2$ is used as nucleus former and in fact in an amount of 3 to 7% by weight.

This brown coloring is normally undesirable and reduces the value of the product. Accordingly, experiments have been undertaken for developing colorless glass ceramics with small thermal expansion. One possibility of obtaining such bodies is described in German Offenlegungsschrift 1 496 098. The glass ceramics indicated therein do not contain any $TiO_2$, but only $ZrO_2$, as nucleus-forming constituent, and this in an amount of 2 to 15% by weight. Since the initial glasses being used contain at least 60% of $SiO_2$ and also other predominantly high-melting constituents, fusion temperatures of at least 1600°C and sometimes up to 1800°C are necessary for the preparation thereof and these temperatures can only be utilized at very great expense. This circumstance greatly restricts the utility of the said glass-crystal mixed bodies, although they have the required freedom from color and in part are satisfactory as regards their thermal expansion.

THE INVENTION

My own experiments for producing transparent glass ceramics with small thermal expansion from more easily meltable glasses by addition of $ZrO_2$ as single nucleus-forming constituent were not successful. With small additions of $TiO_2$ as well as $ZrO_2$, the stated results can be obtained, but then again there is also obtained the aforementioned, undesirable coloring.

The object of the present invention is to provide glass ceramics with small thermal expansion, which are nevertheless transparent and colorless.

This object is achieved according to the invention by basic glasses having a specified composition range as hereinafter more fully outlined having added thereto a mixture of $ZrO_2$ and $Ta_2O_5$ as nucleus-forming constituent. It was surprisingly found that the nucleus-forming action of such a mixture in many glasses which are capable of precipitating crystalline solid solutions having a β-quartz structure is extraordinarily strong, so that, using a suitable heat treatment process, such a large number of irregularly oriented crystals is formed and with it the average size of said crystals remains so small that a glass ceramic of excellent transparency is obtained. Since both $ZrO_2$ and $Ta_2O_5$ are per se colorless and also do not tend to form coloring complexes with other constituents, such glass ceramics do not have any essential color, provided other coloring substances are not deliberately added.

It is possible, but not certain, that the nucleus-forming action of the $ZrO_2$-$Ta_2O_5$ mixture is due to the fact that, during the heat treatment, a large number of minute crystals of the structural type of the cubic $ZrO_2$ are formed, which in their turn serve as starting point for the subsequent crystallization of the crystalline solid solutions of the structural type of β-quartz. It was proved by X-ray diffraction that a large number of such crystals having the structural type of the cubic $ZrO_2$ is present after the conversion process in the glass ceramic and that their average size reaches at most about 100 Angstroms. The $Ta_2O_5$ does not occur as an independent crystalline phase, but is in all probability included in the form of a solid solution into the minute crystals with the structural type of the cubic $ZrO_2$.

The content by weight of $Ta_2O_5$, for best results, should not substantially exceed that of the $ZrO_2$, since otherwise clouding of the glass ceramic may occur. Best results are obtained if the content of $Ta_2O_5$ amounts to about two thirds of the $ZrO_2$ content. It is difficult with usual melting temperatures of at most 1600°C to dissolve more than about 7% by weight of $ZrO_2$ in the glass melts having the composition range as mentioned below. On the other hand, at least about 2% by weight of $ZrO_2$ and 1% by weight of $Ta_2O_5$ are necessary in order to guarantee a nucleus formation sufficient for producing a transparent glass ceramic. Hence, the addition in accordance with the invention of the nucleus-forming constituents $ZrO_2$ and $Ta_2O_5$ covers the range from approximately 2% by weight and 1% by weight, respectively, up to approximately 7% by weight of each. Very favorable results are produced if the $ZrO_2$ content is between 3 and 5% by weight and the $Ta_2O_5$ content is between 2 and 5% by weight. The glasses can be and preferably are free of $TiO_2$.

It is not guaranteed by the use of $ZrO_2$ and $Ta_2O_5$ as nucleus-forming agents that transparent glass ceramics can be produced from all glasses which are capable, because of their composition, to precipitate a relatively large quantity of β-quartz crystalline solid solutions. From many glasses, even with careful heat treatment, generally only opaque or translucent products are formed, of which the thermal expansion is moreover often considerably high.

It has been found that the production of transparent glass ceramics with a thermal expansion of below 15 × $10^{-7}$ /°C in the temperature range from 20 to 300°C is only possible if the initial glasses according to the present invention belong to the composition range which is set out in Table 1. One essential condition in this respect is also that the proportions by weight of $Li_2O$, MgO, ZnO and $P_2O_5$ have to be such that the existing $Al_2O_3$ content is approximately just sufficient for forming the formula units $LiAlO_2$, $MgAl_2O_4$, $ZnAl_2O_4$ and $AlPO_4$; the residue or the deficit of $Al_2O_3$ should not exceed approximately 3% by weight, but in any case not exceed 4% by weight. Otherwise, the danger exists of only a quite insufficient quantity of β-quartz crystalline solid solutions being formed or of no transparent glass ceramic being obtained.

Table 1

Composition, Oxide Basis, % by Weight

|  | Broad Range | Preferred Range |
|---|---|---|
| $SiO_2$ | 45 to 68 | 60 to 68 |
| $Al_2O_3$ | 15 to 30 | 16 to 23 |
| $P_2O_5$ | 0 to 10 | 0 to 6 |
| $Li_2O$ | 2 to 6 | 2.5 to 4.5 |
| MgO | 0 to 3 | 0 to 2 |
| ZnO | 0 to 8 | 0 to 6 |
| $ZrO_2$ | 2 to 7 | 3 to 5 |
| $Ta_2O_5$ | 1 to 7 | 1 to 5 |

In addition to the constituents mentioned in Table 1, the glass can contain relatively small amounts of other substances. Hence, and by way of example, for the purpose of refining the glass, it is frequently expedient to add about 1% of $As_2O_3$ or $Sb_2O_3$ in association with about 1% of $Na_2O$ or $K_2O$, which are introduced as nitrate into the batch. The inclusion of a few percent, e.g., up to 2% by weight, of BaO or CaO may be advisable for facilitating the fusibility and does not have to have a deleterious effect on the properties of the glass ceramic according to the invention. Rare earth oxides can even be included in the batch in amounts up to 12% by weight without causing any harm. It is true that such glasses, i.e., those containing rare earth oxides, have a relatively short processing range, but the glass ceramics which are formed therefrom are characterized by high mechanical strength and excellent transparency. Naturally, they are only colorless if the rare earth ions which are used have no neutral color.

In individual cases, also other constituents in small quantities can be harmless and can provide advantages for special applications. Generally, however, such additions should be kept small, since otherwise there is a great danger that it is not possible to produce the properties according to the invention. In general, the constituents listed in Table 1 should make up at least 85% by weight of the total composition.

The glasses can be produced by the procedures known for lithium aluminum silicate glasses. Thus, the glasses are melted at temperatures of, e.g., at most 1600°, usually at about 1550°, then brought into the required form and annealed in a cooling process. The $Ta_2O_5$ can be added to the batch as such, i.e., as the oxide.

The following heat treatment for the conversion into the vitreous-crystalline state can be developed in very many different ways. What is desirable for a temperature control with the conversion is very dependent on the composition of the glass and the shape of the article. Satisfactory results can always be achieved if the article is heated up at about 10°/h to a temperature which is between 820° and 860°, is left at this temperature for 2 to 6 hours and is then cooled at approximately 100°/h. More rapid heating procedures are also frequently possible; in this case, a residence time of 2 to 4 hours in the temperature range between 680° and 750° is desirable, since in this temperature range already transpositions take place in the glass, which make possible the rapid formation of a large number of nuclei for the crystallization of the β-quartz crystalline solid solutions. The cooling of the articles after the conversion or transformation does not present any difficulties, because of the high resistance to temperature change of the glass ceramic.

The following examples of compositions as indicated in Table 2 are intended to explain the subject of the invention, but not to limit it. Set out in Table 3 are property values for the glasses and property values and production procedures for glass ceramics of Table 2.

TABLE 2

(% by Weight)

| Example No. | $SiO_2$ | $Al_2O_3$ | $P_2O_5$ | $Li_2O$ | $K_2O$ | $Na_2O$ | MgO | ZnO | BaO | $Y_2O_3$ | $La_2O_3$ | $As_2O_3$ | $ZrO_2$ | $Ta_2O_5$ |
|---|---|---|---|---|---|---|---|---|---|---|---|---|---|---|
| 1 | 55.0 | 24.0 | 6.0 | 3.5 | 0.5 | — | 1.0 | 2.0 | — | — | — | 1.0 | 4.0 | 3.0 |
| 2 | 64.0 | 20.0 | 3.0 | 3.8 | 0.5 | — | 1.4 | 0.8 | 0.5 | — | — | 1.0 | 3.0 | 2.0 |
| 3 | 45.0 | 27.5 | 7.5 | 5.0 | — | — | 0.5 | 1.0 | 1.5 | — | — | — | 6.0 | 6.0 |
| 4 | 61.4 | 21.0 | — | 2.8 | 0.0 | — | 1.0 | 6.0 | 1.6 | — | — | 0.8 | 3.5 | 1.5 |
| 5 | 65.0 | 21.0 | — | 3.0 | — | — | 3.0 | 1.1 | — | — | — | 0.9 | 3.0 | 3.0 |
| 6 | 49.5 | 18.0 | 5.0 | 4.1 | — | — | — | 1.4 | — | — | 8.0 | — | 7.0 | 7.0 |
| 7 | 47.0 | 19.0 | 5.0 | 4.5 | — | 0.5 | — | — | 1.0 | — | 10.0 | 1.0 | 6.0 | 6.0 |
| 8 | 56.5 | 20.0 | 3.0 | 4.0 | 1.0 | — | 1.0 | 1.5 | — | 3.0 | — | 1.0 | 5.0 | 4.0 |

TABLE 3

| Example No. | Glass | | | Heat treatment | Glass Ceramic | | |
|---|---|---|---|---|---|---|---|
|  | Tg (°C) | α20-300° ($10^{-7}$/°C) | Density (g/cc³) |  | α20-300° ($10^{-7}$/°C) | α20-700° ($10^{-7}$/°C) | Density (g/cc³) |
| 1 | 687 | 39 | 2.515 | at 10°/h up to 830°, 3 h holding time | −7.6 | +4.0 | 2.598 |
| 2 | 692 | 39 |  | at 10°/h up to 830°, 3 h holding time | −1.0 |  |  |
| 3 | 690 | 51 | 2.647 | at 10°/h up to 830°, 3 h holding time | −5.8 |  | 2.673 |
| 4 | 675 | 36 | 2.587 | 100°/h up to 700°, 2 h holding time |  |  |  |

TABLE 3-continued

| Example No. | Glass Tg (°C) | α20-300° ($10^{-7}$/°C) | Density (g/cc³) | Heat treatment | Glass Ceramic α20-300° ($10^7$/°C) | α20-700° ($10^{-7}$/°C) | Density (g/cc³) |
|---|---|---|---|---|---|---|---|
| 5 | 685 | 39 | | 100°/h up to 800°, 2 h holding time | −1.7 | +6.5 | 2.651 |
| | | | | 100°/h up to 700°, 2 h holding time | | | |
| | | | | 100°/h up to 800°, 2 h holding time | +10.0 | | |
| 6 | 677 | 50 | 2.790 | at 10°/h up to 790°, 5 h holding time | −3.8 | +8.5 | 2.879 |
| 7 | 675 | 48 | 2.804 | at 100°/h up to 690°, at 10°/h | | | |
| | | | | up to 870°, 3 h holding time | +2.9 | | 2.877 |
| 8 | 680 | 50 | 2.631 | at 50°/h up to 830°, 3 h holding time | +7.0 | | 2.616 |

If the compositions indicated in the examples are melted without the component $Ta_2O_5$, a glass ceramic having satisfactory transparency is not obtained from any of these glasses, but always translucent products. On the other hand, if the $Ta_2O_5$ is replaced by $Nb_2O_5$, transparent glass ceramics can be obtained, but these have a brownish coloration.

By the heat treatment in all indicated examples, particularly β-quartz crystalline solid solutions are formed as well as those crystals already mentioned with the structural type of the cubic $ZrO_2$. The proportion of the β-quartz crystalline solid solutions in all cases referred to, amounts to at least 50% and usually even about 70% of the volume of the glass ceramic. Where substantial amounts of components such as CaO, BaO or rare earth oxides are included in the composition, also other crystalline phases can occur in a subordinate proportion. These additional phases usually cannot be reliably identified by X-ray photography because of their small quantity and small crystallite size.

If during the heat treatment a maximum temperature which, depending on composition, is between 850° and 950°, is exceeded or is maintained too long, the transparency of the glass ceramic articles is lost, because of increase in grain size of the β-quartz crystalline solid solutions because of collective crystallization, or because of recrystallization to crystals having the β-spodumene structural type. The same limits are applicable as regards the use of the finished glass ceramics at relatively high temperatures The lower limit for the expansion coefficient x can be $-10 \times 10^{-7}$ /°C, preferably $-5 \times 10^{-7}$ /°C.

What is claimed is:

1. Transparent colorless glass ceramic with a linear thermal expansion coefficient less than $15 \times 10^{-7}$ /°C in the temperature range of about 20° to 300°C, containing irregularly oriented crystals of the structural type of β-quartz, consisting essentially of the following on an oxide basis:

| | | |
|---|---|---|
| $SiO_2$ | 45 to | 68% by weight |
| $Al_2O_3$ | 15 to | 30% by weight |
| $P_2O_5$ | 0 to | 10% by weight |
| $Li_2O$ | 2 to | 6% by weight |
| MgO | 0 to | 3% by weight |
| ZnO | 0 to | 8% by weight |
| $ZrO_2$ | 2 to | 7% by weight |
| $Ta_2O_5$ | 1 to | 7% by weight | the contents of $Li_2O$, MgO, ZnO and $P_2O_5$ being such that the existing $Al_2O_3$ content, to within a residue or a deficit of $Al_2O_3$ of up to about 3% by weight, is sufficient for forming the formula units $LiAlO_2$, $MgAl_2O_4$ $ZnAl_2O_4$ and $AlPO_4$.

2. Glass ceramic according to claim 1, at least 85% by weight of the glass ceramic being of the composition stated.

3. Glass ceramic according to claim 1, characterized in that it additionally contains up to 2% by weight of BaO and/or CaO.

4. Glass ceramic according to claim 1, characterized in that it contains up to 12% by weight of rare earth oxides having no natural color.

5. Glass ceramic according to claim 3, characterized in that it contains up to 12% by weight of rare earth oxides.

6. Glass ceramic according to claim 1, the $ZrO_2$ content and $Ta_2O_5$ content being:

| | |
|---|---|
| $ZrO_2$ | 3 to 5% by weight |
| $Ta_2O_5$ | 2 to 5% by weight | with the proviso that the $Ta_2O_5$ content is equal to or smaller than the $ZrO_2$ content.

7. Glass ceramic according to claim 2, the $ZrO_2$ content and $Ta_2O_5$ content being:

| | |
|---|---|
| $ZrO_2$ | 3 to 5% by weight |
| $Ta_2O_5$ | 2 to 5% by weight | with the proviso that the $Ta_2O_5$ content is equal to or smaller than the $ZrO_2$ content.

8. Glass ceramic according to claim 3, the $ZrO_2$ content and $Ta_2O_5$ content being:

| | |
|---|---|
| $ZrO_2$ | 3 to 5% by weight |
| $Ta_2O_5$ | 2 to 5% by weight | with the proviso that the $Ta_2O_5$ content is equal to or smaller than the $ZrO_2$ content.

9. Glass ceramic according to claim 4, the $ZrO_2$ content and $Ta_2O_5$ content being:

| | |
|---|---|
| $ZrO_2$ | 3 to 5% by weight |
| $Ta_2O_5$ | 2 to 5% by weight | with the proviso that the $Ta_2O_5$ content is equal to or smaller than the $ZrO_2$ content.

10. Glass ceramic according to claim 5, the $ZrO_2$ content and $Ta_2O_5$ content being:

| | |
|---|---|
| $ZrO_2$ | 3 to 5% by weight |

-continued

| | |
|---|---|
| Ta₂O₅ | 2 to 5% by weight | with the proviso that the Ta₂O₅ content is equal to or smaller than the ZrO₂ content.

11. Glass ceramic according to claim 1, the Ta₂O₅ content being about two-thirds of the ZrO₂ content.

12. Glass ceramic according to claim 6, the Ta₂O₅ content being about two-thirds of the ZrO₂ content.

13. Glass ceramic according to claim 1, free of TiO₂.

14. Glass convertible to a transparent colorless glass ceramic, consisting essentially of the following on an oxide basis:

| | |
|---|---|
| SiO₂ | 45 to 68% by weight |
| Al₂O₃ | 15 to 30% by weight |
| P₂O₅ | 0 to 10% by weight |
| Li₂O | 2 to 6% by weight |
| MgO | 0 to 3% by weight |
| ZnO | 0 to 8% by weight |
| ZrO₂ | 2 to 7% by weight |
| Ta₂O₅ | 1 to 7% by weight | the contents of Li₂O, MgO, ZnO and P₂O₅ being such that the existing Al₂O₃ content, to within a residue or a deficit of Al₂O₃ of up to about 3% by weight, is sufficient for forming the formula units LiAlO₂, MgAl₂O₄, ZnAl₂O₄ and AlPO₄.

15. Glass ceramic according to claim 1, consisting essentially of the following on an oxide basis

| | |
|---|---|
| SiO₂ | 60 to 68 % by weight |
| Al₂O₃ | 16 to 23 % by weight |
| P₂O₅ | 0 to 6 % by weight |
| Li₂O | 2.5 to 4.5 by weight |
| MgO | 0 to 2 by weight |
| ZnO | 0 to 6 by weight |
| ZrO₂ | 3 to 5 by weight |
| Ta₂O₅ | 1 to 5 by weight. |

16. Glass according to claim 1, characterized in that it contains up to 12% by weight of La₂O₃ or Y₂O₃.

17. Glass according to claim 3, characterized in that it contains up to 12% by weight of La₂O₃ or Y₂O₃.

18. Glass ceramic according to claim 1, and consisting essentially of:

| | |
|---|---|
| SiO₂ | 45 to 65 % by weight |
| Al₂O₃ | 18 to 27.5 % by weight |
| P₂O₅ | 0 to 7.5 % by weight |
| Li₂O | 2.8 to 5.0 % by weight |
| K₂O | 0 to 1.0 % by weight |
| Na₂O | 0 to 0.5 % by weight |
| MgO | 0 to 3 % by weight |
| ZnO | 0 to 6 % by weight |
| BaO | 0 to 1.6 % by weight |
| Y₂O₃ | 0 to 3.0 % by weight |
| La₂O₃ | 0 to 10 % by weight |
| As₂O₃ | 0 to 1.0 % by weight |
| ZrO₂ | 3 to 7 % by weight |
| Ta₂O₅ | 1.5 to 7 % by weight. |

19. Glass ceramic according to claim 18, consisting essentially of:

| | |
|---|---|
| SiO₂ | 55.0 % by weight |
| Al₂O₃ | 24.0 % by weight |
| P₂O₅ | 6.0 % by weight |
| Li₂O | 3.5 % by weight |
| K₂O | 0.5 % by weight |
| MgO | 1.0 % by weight |
| ZnO | 2.0 % by weight |
| As₂O₃ | 1.0 % by weight |
| ZrO₂ | 4.0 % by weight |
| Ta₂O₅ | 3.0 % by weight. |

20. Glass ceramic according to claim 18, consisting essentially of:

| | |
|---|---|
| SiO₂ | 64.0 % by weight |
| Al₂O₃ | 20.0 % by weight |
| P₂O₅ | 3.0 % by weight |
| Li₂O | 3.8 % by weight |
| K₂O | 0.5 % by weight |
| MgO | 1.4 % by weight |
| ZnO | 0.8 % by weight |
| BaO | 0.5 % by weight |
| As₂O₃ | 1.0 % by weight |
| ZrO₂ | 3.0 % by weight |
| Ta₂O₅ | 2.0 % by weight. |

21. Glass ceramic according to claim 18, consisting essentially of:

| | |
|---|---|
| SiO₂ | 45.0 % by weight |
| Al₂O₃ | 27.5 % by weight |
| P₂O₅ | 7.5 % by weight |
| Li₂O | 5.0 % by weight |
| MgO | 0.5 % by weight |
| ZnO | 1.0 % by weight |
| BaO | 1.5 % by weight |
| ZrO₂ | 6.0 % by weight |
| Ta₂O₅ | 6.0 % by weight. |

22. Glass ceramic according to claim 18, consisting essentially of:

| | |
|---|---|
| SiO₂ | 61.4 % by weight |
| Al₂O₃ | 21.0 % by weight |
| Li₂O | 2.8 % by weight |
| K₂O | 0.4 % by weight |
| MgO | 1.0 % by weight |
| ZnO | 6.0 % by weight |
| BaO | 1.6 % by weight |
| As₂O₃ | 0.8 % by weight |
| ZrO₂ | 3.5 % by weight |
| Ta₂O₅ | 1.5 % by weight. |

23. Glass ceramic according to claim 18, consisting essentially of:

| | |
|---|---|
| SiO₂ | 65.0 % by weight |
| Al₂O₃ | 21.0 % by weight |
| Li₂O | 3.0 % by weight |
| MgO | 3.0 % by weight |
| ZnO | 1.1 % by weight |
| As₂O₃ | 0.9 % by weight |
| ZrO₂ | 3.0 % by weight |
| Ta₂O₅ | 3.0 % by weight. |

24. Glass ceramic according to claim 18, consisting essentially of:

| | |
|---|---|
| SiO₂ | 49.5 % by weight |
| Al₂O₃ | 18.0 % by weight |
| P₂O₅ | 5.0 % by weight |
| Li₂O | 4.1 % by weight |
| ZnO | 1.4 % by weight |
| La₂O₃ | 8.0 % by weight |
| ZrO₂ | 7.0 % by weight |

-continued

| | |
|---|---|
| $Ta_2O_5$ | 7.0 % by weight. |

25. Glass ceramic according to claim 18, consisting essentially of:

| | |
|---|---|
| $SiO_2$ | 47.0 % by weight |
| $Al_2O_3$ | 19.0 % by weight |
| $P_2O_5$ | 5.0 % by weight |
| $Li_2O$ | 4.5 % by weight |
| $Na_2O$ | 0.5 % by weight |
| BaO | 1.0 % by weight |
| $La_2O_3$ | 10.0 % by weight |
| $As_2O_3$ | 1.0 % by weight |
| $ZrO_2$ | 6.0 % by weight |
| $Ta_2O_5$ | 6.0 % by weight. |

26. Glass ceramic according to claim 18, consisting essentially of:

| | |
|---|---|
| $SiO_2$ | 56.5 % by weight |
| $Al_2O_3$ | 20.0 % by weight |
| $P_2O_3$ | 3.0 % by weight |
| $Li_2O$ | 4.0 % by weight |
| $K_2O$ | 1.0 % by weight |
| MgO | 1.0 % by weight |
| ZnO | 1.5 % by weight |
| $Y_2O_3$ | 3.0 % by weight |
| $As_2O_3$ | 1.0 % by weight |
| $ZrO_2$ | 5.0 % by weight |
| $Ta_2O_5$ | 4.0 % by weight. |

27. Glass ceramic according to claim 1, the residue or excess of $Al_2O_3$ being +2.7 to −1.34.

* * * * *

UNITED STATES PATENT OFFICE
CERTIFICATE OF CORRECTION

PATENT NO. : 3,977,886
DATED : August 31, 1976
INVENTOR(S) : Gerd Müller

It is certified that error appears in the above-identified patent and that said Letters Patent are hereby corrected as shown below:

Column 3, Table 2, under $K_2O$, the fourth example, change "0.0" to --0.4--.

Signed and Sealed this

First Day of March 1977

[SEAL]

Attest:

RUTH C. MASON
Attesting Officer

C. MARSHALL DANN
Commissioner of Patents and Trademarks